(12) United States Patent
Mora López et al.

(10) Patent No.: US 10,776,170 B2
(45) Date of Patent: Sep. 15, 2020

(54) SOFTWARE SERVICE EXECUTION APPARATUS, SYSTEM, AND METHOD

(71) Applicant: Fujitsu Limited, Kawasaki-shi, Kanagawa (JP)

(72) Inventors: José Mora López, Madrid (ES); Victor De La Torre, Madrid (ES)

(73) Assignee: FUJITSU LIMITED, Kawasaki (JP)

( * ) Notice: Subject to any disclaimer, the term of this patent is extended or adjusted under 35 U.S.C. 154(b) by 530 days.

(21) Appl. No.: 15/703,018

(22) Filed: Sep. 13, 2017

(65) Prior Publication Data

US 2018/0113746 A1    Apr. 26, 2018

(30) Foreign Application Priority Data

Oct. 21, 2016 (DE) .......................... 10 2016 220 778

(51) Int. Cl.
*G06F 9/46* (2006.01)
*G06F 9/50* (2006.01)
(Continued)

(52) U.S. Cl.
CPC ............ *G06F 9/5055* (2013.01); *G06F 8/453* (2013.01); *G06F 9/30134* (2013.01);
(Continued)

(58) Field of Classification Search
CPC .. G06F 9/5055; G06F 9/44505; G06F 9/5016; G06F 9/30134; G06F 8/453; G06N 3/00; G06N 3/08; G06N 3/0427
See application file for complete search history.

(56) References Cited

U.S. PATENT DOCUMENTS

| 4,068,300 A | 1/1978 | Bachman |
| 6,961,736 B1 | 11/2005 | Amirghodsi |

(Continued)

FOREIGN PATENT DOCUMENTS

| CA | 2883922 | 8/2011 |
| CN | 101262374 | 9/2008 |

(Continued)

OTHER PUBLICATIONS

US 9,299,346 B1, 03/2016, Hart et al. (withdrawn)
(Continued)

*Primary Examiner* — Adam Lee
(74) *Attorney, Agent, or Firm* — Staas & Halsey LLP

(57) ABSTRACT

A software service execution apparatus comprising a registry of software services, each service to execute a data processing function in the registry; a controller, to receive a processing request defining requested data processing functions, compose an execution schedule of software services from the software services identified, fulfill the data processing request by identifying a software service that matches the requested data processing function, include the identified software service in the execution schedule, and control execution of the schedule. The apparatus further comprises a machine learning mechanism configured to maintain a record of the composing. The composing includes, in an automated mode, if more than one software services is identified, requesting a selection of one software service as an automated selection candidate; the mechanism providing a selection of one software service, basing the selection on analysis of the composing and execution of execution schedules in which an automated selection candidate is identified.

13 Claims, 5 Drawing Sheets

(51) Int. Cl.
*G06F 8/41* (2018.01)
*G06F 9/30* (2018.01)
*G06F 9/445* (2018.01)
*G06N 3/00* (2006.01)

(52) U.S. Cl.
CPC ........ *G06F 9/44505* (2013.01); *G06F 9/5016* (2013.01); *G06N 3/00* (2013.01)

(56) References Cited

U.S. PATENT DOCUMENTS

| | | | |
|---|---|---|---|
| 7,433,835 | B2 | 10/2008 | Frederick et al. |
| 7,584,152 | B2 | 9/2009 | Gupta et al. |
| 7,617,174 | B2 | 11/2009 | Chen et al. |
| 7,734,515 | B1 | 6/2010 | Frederick et al. |
| 7,912,763 | B1 | 3/2011 | Frederick et al. |
| 8,019,652 | B1 | 9/2011 | Frederick et al. |
| 8,019,653 | B1 | 9/2011 | Frederick et al. |
| 8,036,261 | B2 | 10/2011 | Tsutsui et al. |
| 8,312,426 | B2 | 11/2012 | Bouillet et al. |
| 8,391,590 | B2 | 5/2013 | Yalla et al. |
| 8,788,269 | B2 | 7/2014 | Stifelman et al. |
| 9,064,006 | B2 | 6/2015 | Hakkani-Tur et al. |
| 9,268,617 | B1 | 2/2016 | Croteau et al. |
| 9,299,331 | B1 | 3/2016 | Durham et al. |
| 9,600,333 | B1* | 3/2017 | Unrau ................... G06F 9/445 |
| 9,753,744 | B1 | 9/2017 | Wells et al. |
| 2002/0083060 | A1 | 6/2002 | Wang et al. |
| 2004/0107821 | A1 | 6/2004 | Alcalde et al. |
| 2005/0060350 | A1 | 3/2005 | Baum et al. |
| 2005/0165656 | A1 | 7/2005 | Frederick et al. |
| 2005/0177372 | A1 | 8/2005 | Wang et al. |
| 2006/0013451 | A1 | 1/2006 | Haitsma |
| 2006/0136428 | A1 | 6/2006 | Syeda-Mahmood |
| 2006/0206883 | A1 | 9/2006 | Sabbouh |
| 2008/0208855 | A1 | 8/2008 | Lingenfelder et al. |
| 2009/0172691 | A1* | 7/2009 | Barros ................... G06Q 10/06 718/104 |
| 2009/0241117 | A1* | 9/2009 | Dasgupta ............... G06F 9/5038 718/101 |
| 2009/0277322 | A1 | 11/2009 | Cai et al. |
| 2011/0138394 | A1* | 6/2011 | Ravishankar ......... G06F 9/5038 718/104 |
| 2011/0314375 | A1 | 12/2011 | Zaika et al. |
| 2012/0016678 | A1 | 1/2012 | Gruber et al. |
| 2013/0019285 | A1 | 1/2013 | Barborak et al. |
| 2013/0054244 | A1 | 2/2013 | Bao et al. |
| 2013/0097320 | A1 | 4/2013 | Ritter et al. |
| 2013/0117207 | A1 | 5/2013 | Kim et al. |
| 2013/0144876 | A1 | 6/2013 | Mehanna et al. |
| 2013/0151451 | A1 | 6/2013 | Lee et al. |
| 2013/0275164 | A1 | 10/2013 | Gruber et al. |
| 2013/0311997 | A1 | 11/2013 | Gruber et al. |
| 2014/0149104 | A1 | 5/2014 | Kim et al. |
| 2014/0201629 | A1 | 7/2014 | Heck |
| 2014/0280616 | A1 | 9/2014 | Ramanathan et al. |
| 2014/0310127 | A1 | 10/2014 | Hoch et al. |
| 2014/0337358 | A1 | 11/2014 | Mitra et al. |
| 2014/0337814 | A1 | 11/2014 | Kalns et al. |
| 2014/0344439 | A1 | 11/2014 | Kempf et al. |
| 2014/0365885 | A1 | 12/2014 | Carson et al. |
| 2015/0245216 | A1 | 8/2015 | Cohen et al. |
| 2015/0271276 | A1 | 9/2015 | Edlund et al. |
| 2015/0317184 | A1* | 11/2015 | Winkler .................. G08C 19/00 718/102 |
| 2015/0348554 | A1 | 12/2015 | Orr et al. |
| 2015/0382079 | A1 | 12/2015 | Lister et al. |
| 2016/0011911 | A1* | 1/2016 | Rangaraju ........... G06F 16/2282 718/104 |
| 2016/0026680 | A1 | 1/2016 | Banerjee et al. |
| 2016/0026913 | A1 | 1/2016 | Moon et al. |
| 2016/0044380 | A1 | 2/2016 | Barrett |
| 2016/0048771 | A1 | 2/2016 | Chen et al. |
| 2016/0062604 | A1 | 3/2016 | Kraljic et al. |
| 2016/0063874 | A1 | 3/2016 | Czerwinski et al. |
| 2016/0063989 | A1 | 3/2016 | Deleeuw |
| 2016/0063998 | A1 | 3/2016 | Krishnamoorthy et al. |
| 2016/0070580 | A1 | 3/2016 | Johnson et al. |
| 2016/0140172 | A1 | 5/2016 | Bornea et al. |
| 2017/0006116 | A1 | 1/2017 | Kelly et al. |
| 2017/0017795 | A1* | 1/2017 | DiGiambattista ......... G06F 8/61 |
| 2018/0039567 | A1 | 2/2018 | Rajagopalan et al. |
| 2018/0075115 | A1 | 3/2018 | Murray et al. |

FOREIGN PATENT DOCUMENTS

| | | |
|---|---|---|
| CN | 103038738 | 4/2013 |
| CN | 104202416 | 12/2014 |
| CN | 105164719 | 12/2015 |
| CN | 105357143 | 2/2016 |
| DE | 102012019178 | 4/2013 |
| EP | 2325837 | 5/2011 |
| EP | 2618280 | 7/2013 |
| EP | 2704029 | 3/2014 |
| EP | 2894587 | 7/2015 |
| EP | 3041198 | 7/2016 |
| GB | 2495222 | 4/2013 |
| KR | 10-2012-0052610 | 5/2012 |
| KR | 10-2013-0050707 | 5/2013 |
| KR | 10-2013-0064960 | 6/2013 |
| KR | 10-2014-0066640 | 6/2014 |
| TW | 201543243 | 11/2015 |
| TW | 201544974 | 12/2015 |
| TW | 201545504 | 12/2015 |
| WO | 2004/107217 | 12/2004 |
| WO | 2008/015417 | 2/2008 |
| WO | 2015/191965 | 12/2015 |
| WO | 2016/049437 A1 | 3/2016 |
| WO | 2016/105624 | 6/2016 |

OTHER PUBLICATIONS

U.S. Office Action dated Oct. 2, 2019 in U.S. Appl. No. 15/679,406.
Alfio Ferrara et al., Automatic Identity Recognition in the Semantic Web, Universita degli Studi di Milano, 15 pages.
P. Cornillon et al., "Opendap: Accessing Data in a Distributed, Heterogeneous Environment", Data Science Journal, vol. 2, Nov. 2003, 11 pages.
Sebastian Bremm et al., "Assisted Descriptor Selection Based on Visual Comparative Data Analysis", Eurographics / IEEE Symposium on Visualization 2011, 10 pages.
Avery Li-Chun Wang et al., "An Industrial-Strength Audio Search Algorithm", 7 pages.
Sabri Boutemedjet, et al., "Unsupervised Feature Selection for Accurate Recommendation of High-Dimensional Image Data", 8 pages.
European Search Report dated May 10, 2017 in European Patent Application No. 16205543.8.
Christian Drumm et al: "Quickmig", Proceedings of the ACM Sixteenth Conference on Information and Knowledge Management (CIKH 2007), Nov. 6-9, 2007, Lisboa, Portugal, ACM, 2 Penn Plaza, Suite 701 New York NY 10121-0701 USA, Nov. 6, 2007 (Nov. 6, 2007), pp. 107-116, XP058192912, DOI: 10.1145/1321440. 1321458 ISBN: 978-1-59593-803-9.
Anhai Doan et al: "Reconciling Schemas of Disparate Data Sources: A Machine-Learning Approach", ACM SIGMOD 2001, Santa Barbara, CA, USA, May 24, 2001 (May 24, 2001), XP055046420, Retrieved from the Internet: URL:http://reference.kfupm.edu.sa/content/r/e/reconciling_schemas_of_disparate_data_so_34545.pdf [retrieved on 2812-12-83].
"Corel Image Features Data Set", UCI Machine Learning Repository, retrieved from the internet Jun. 2017, https://archive.ics.uci.edu/ml/datasets/Corel+Image+Features, 3 pages.
TechTC—Technion Repository of Text Categorization Datasets, Maintained by Evgeniy Gabrilovich, retrieved from the internet Jun. 2017, http://techtc.cs.technion.ac.il/, 7 pages.
E. Prud'hommeaux and A. Seaborne, "SPARQL Query Language for RDF," W3C, W3C Recommendation, Jan. 2008, 74 pages.
F. Holzschuher and R. Peinl, "Performance of Graph Query Languages" Comparison of Cypher, Gremlin and Native Access in Neo4j, 2013, 10 pages.

(56) References Cited

OTHER PUBLICATIONS

J. Mora and O. Corcho, "Engineering Optimisations in Query Rewriting for OBDA," in Proceedings of the 9th International Conference on Semantic Systems, 2013, pp. 41-48.

J. Mora, R. Rosati, and O. Corcho, "Kyrie2: Query Rewriting under Extensional Constraints in \mathcal{ELHIO}," in the Semantic Web ISWC 2014, P. Mika, T. Tudorache, A. Bernstein, C. Welty, C. Knoblock, D. Vrandečić, P. Groth, N. Noy, K. Janowicz, and C. Goble, Eds. Springer International Publishing, 2014, pp. 568-583.

L. Richardson and S. Ruby, RESTful web services—web services for the real world. O'Reilly, 2007, 448 pages.

S. Vinoski, "RESTful Web Services Development Checklist," IEEE Internet Computing, vol. 12, No. 6, pp. 94-96, Nov. 2008, 3 pages.

R. T. Fielding, Architectural Styles and the Design of Network-based Software Architectures. 2000, 180 pages.

M. zur Muehlen, J. V. Nickerson, and K. D. Swenson, "Developing web services choreography standards—the case of REST vs. SOAP." Decision Support Systems, vol. 40, No. 1, pp. 9-29, 2005.

M. Arenas, A. Bertails, E. Prud'hommeaux, and J. Sequeda, "A Direct Mapping of Relational Data to RDF," 2012, 11 pages.

S. Thakkar, J. L. Ambite, and C. A. Knoblock, "Composing, optimizing, and executing plans for bioinformatics web services," The VLDB Journal, vol. 14, No. 3, pp. 330-353, Sep. 2005.

European Search Report dated Jul. 4, 2017 in European Patent Application No. 16204653.6.

Ison, Jon, Kristoffer Rapacki, Hervé Ménager, Matúš Kalaš, Emil Rydza, Piotr Chmura, Christian Anthon, et al. 2016. "Tools and Data Services Registry: A Community Effort to Document Bioinformatics Resources." Nucleic Acids Research 44 (D1): D38-D47. doi:10.1093/nar/gkv1116.

Maleshkova, Maria, Carlos Pedrinaci, and John Domingue. 2009. "Supporting the Creation of Semantic RESTful Service Descriptions." In. Washington D.C., USA. http://oro.open.ac.uk/23106/, 15 pages.

Rama Akkiraju et al. "Web Service Semantics—WSDL-S". In: Kno.e.sis Publications (Apr. 2005). url: http://corescholar.libraries.wright.edu/knoesis/69, 44 pages.

David Chappell, Enterprise Service Bus. en. "O'Reilly Media, Inc.", Jun. 2004. isbn: 978-0-596-00675-4.

R. Chinnici et al. Web Services Description Language (WSDL) version 1.2. Tech. rep. Working Draft. 2002. url: http://www.w3.org/TR/wsdl (visited on Mar. 14, 2016), 27 pages.

F. Curbera et al. "Unraveling the Web services web: an introduction to SOAP, WSDL, and UDDI". In: IEEE Internet Computing 6.2 (Mar. 2002), pp. 86-93. issn: 1089-7801. doi: 10.1109/4236.991449, 8 pages.

Keir Davis, John W. Turner, and Nathan Yocom. "Client-Server Architecture". en. In: The Definitive Guide to Linux Network Programming. DOI: 10.1007/978-1-4302-0748-1 5. Apress, 2004, pp. 99-135. isbn: 978-1-59059-322-6 978-1-4302-0748-1. url: http://link.springer.com/chapter/10.1007/978-1-4302-0748-1_5 (visited on Mar. 14, 2016).

Daniel Fitzner, Jorg Hoffmann, and Eva Klien. "Functional description of geoprocessing services as conjunctive datalog queries". en. In: GeoInformatica 15.1 (Oct. 2009), pp. 191-221. issn: 1384-6175, 1573-7624. doi: 10.1007/s10707-009-0093-4. url: http://link.springer.com/article/10.1007/s10707-009-0093-4 (visited on Mar. 29, 2016).

Martin Hofmann. "Syntax and semantics of dependent types". en. In: Extensional Constructs in Intensional Type Theory. CPHC/BCSDistinguished Dissertations. DOI: 10.1007/978-1-4471-0963-1 2. Springer London, 1997, pp. 13-54. isbn: 978-1-4471-1243-3 978-1-4471-0963-1. url: http://link.springer.com/chapter/10.1007/978-14471-0963-1_2 (visited on Mar. 14, 2016).

Kopecky, K. Gomadam, and T. Vitvar. "hRESTS: An HTML Microformat for Describing RESTful Web Services". In:IEEE/WIC/ACM International Conference on Web Intelligence and Intelligent Agent Technology, 2008. WI-IAT '08. vol. 1. Dec. 2008, pp. 619-625. doi: 10.1109/WIIAT.2008.379.

Jacek Kopecky, Web Services Description Language (WSDL) Version 2.0: RDF Mapping. Published: World Wide Web Consortium, Note NOTE-wsdl20-rdf-20070626. Jun. 2007, 39 pages.

Kathryn B. Laskey and Kenneth Laskey. "Service oriented architecture". en. In: Wiley Interdisciplinary Reviews: Computational Statistics 1.1 (Jul. 2009), pp. 101-105. issn: 1939-0068. doi: 10.1002/wics.8. url: http://onlinelibrary.wiley.com/doi/10.1002/wics.8/abstract (visited on Mar. 14, 2016).

David Martin et al. "OWL-S: Semantic markup for web services". In: W3C member submission 22 (2004), 28 pages.

Sam Newman. Building Microservices. en. "O'Reilly Media, Inc.", Feb. 2015. isbn: 978-1-4919-5033-3, 473 pages.

Carlos Pedrinaci et al. "Adaptive Service Binding with Lightweight Semantic Web Services". en. In: Service Engineering. DOI: 10.1007/978-3-7091-0415-6 9. Springer Vienna, 2011; pp. 233-260. isbn: 9783-7091-0414-9 978-3-7091-0415-6. url: http://link.springer.com/chapter/10.1007/978-3-7091-0415-6_9 (visited on Mar. 30, 2016).

R. Perrey and M. Lycett. "Service-oriented architecture". In: 2003 Symposium on Applications and the Internet Workshops, 2003. Proceedings. Jan. 2003, pp. 116-119. doi: 10.1109/SAINTW.2003.1210138.

Amit Sheth, Karthik Gomadam, and Ajith Ranabahu. "Semantics Enhanced Services: METEOR-S, SAWSDL and SA-REST".In: Bulletin of the Technical Committee on Data Engineering (Sep. 2008), pp. 8-12. url: http://corescholar.libraries.wright.edu/knoesis/635.

J. Thones. "Microservices". In: IEEE Software 32.1 (Jan. 2015), pp. 116-116. issn: 0740-7459. doi:10.1109/MS.2015.11.

Tomas Vitvar et al. "WSMO-Lite Annotations for Web Services". en. In: The Semantic Web: Research and Applications. Ed. by Sean Bechhofer et al. Lecture Notes in Computer Science 5021. DOI: 10.1007/978-3-540-68234-9 49. Springer Berlin Heidelberg, Jun. 2008, pp. 674-689. isbn: 978-3-540-68233-2 978-3-540-68234-9. url: http://link.springer.com/chapter/10.1007/978-3-540-682349_49 (visited on Mar. 30, 2016).

H. Q. Yu et al. "Developing RDF-based Web Services for supporting runtime matchmaking and invocation". In: 2011 7th International Conference on Next Generation Web Services Practices (NWeSP). Oct. 2011, pp. 392-397. doi: 10.1109/NWeSP.2011.6088211.

Martin Abadi et al. "TensorFlow: Large-Scale Machine Learning on Heterogeneous Distributed Systems". In: arXiv:1603.04467 [cs] (Mar. 2016). arXiv: 1603.04467. url: http://arxiv.org/abs/ 1603.04467 (visited on Apr. 5, 2016).

Soheil Bahrampour et al. "Comparative Study of Caffe, Neon, Theano, and Torch for Deep Learning." In: CoRR abs/1511.06435 (2015). url: http://dblp.uni-trier.de/db/journals/corr/corr1511.html#BahrampourRSS15 (visited on Apr. 5, 2016).

Lynsey Barber. This is why the world needs a Facebook virtual assistant. Aug. 2015. url: http://www.cityam.com/223196/ why-world-needs-facebook-m-its-new-ai-and-peoplepowered-virtual-personal-assistantmessenger (visited on Apr. 5, 2016).

James Bergstra et al. "Theano: Deep learning on gpus with python". In: NIPS 2011, BigLearning Workshop, Granada, Spain. 2011. url: http://biglearn.org/2011/files/papers/biglearn2011_submission_18.pdf (visited on Apr. 5, 2016).

Jeff Bezanson et al. "Julia: A Fast Dynamic Language for Technical Computing". In: arXiv:1209.5145 [cs] (Sep. 2012). arXiv: 1209.5145. url: http://arxiv.org/abs/1209.5145 (visited on Apr. 1, 2016).

Brian X. Chen. "Siri, Alexa and Other Virtual Assistants Put to the Test". In: The New York Times (Jan. 2016). issn: 0362-4331. url: http://www.nytimes.com/2016/01/28/technology/ personaltech/siri-alexa-and-other-virtualassistantsput-to-the-test.html (visited on Apr. 5, 2016).

Gianmarco De Francisci Morales and Albert Bifet. "Samoa: Scalable advanced massive online analysis". In: The Journal of Machine Learning Research 16.1 (2015), pp. 149-153. url: http://dl.acm.org/citation.cfm?id=2789277 (visited on Apr. 5, 2016).

Janez Demsar et al. "Orange: data mining toolbox in python." In: Journal of Machine Learning Research 14.1 (2013), pp. 2349-2353. url: http://dblp.uni-trier.de/db/journals/jmlr/jmlr14.html#DemsarCEGHMMPTSSUZZZZ13 (visited on Apr. 5, 2016).

(56) References Cited

OTHER PUBLICATIONS

A. Ghoting et al. "SystemML: Declarative machine learning on MapReduce". In: 2011 IEEE 27th International Conference on Data Engineering (ICDE). Apr. 2011, pp. 231-242. doi: 10.1109/ICDE. 2011.5767930.

Yangqing Jia et al. "Caffe: Convolutional Architecture for Fast Feature Embedding". In: Proceedings of the 22$^{nd}$ ACM International Conference on Multimedia. MM '14. New York, NY, USA: ACM, 2014, pp. 675-678. isbn: 978-1-4503-3063-3. doi: 10.1145/2647868.2654889. url: http://doi.acm.org/10.1145/2647868.2654889 (visited on Apr. 5, 2016).

Eric Jones, Travis Oliphant, and Pearu Peterson. "SciPy: Open source scientific tools for Python". In: (2001). url: http://www.scipy.org (visited on Apr. 5, 2016).

Supun Kamburugamuve et al. Survey of distributed stream processing for large stream sources. Tech. rep. Technical report. 2013. Available at http://grids. ucs. indiana. edu/ptliupages/publications/survey stream proc essing. pdf, 2013. url: https://www.sics.se/~amir/files/ download/dic/2013%20-%20Survey%20of%20Distributed%20Stream%20Processing%20for%20Large%20Stream%20Sources.pdf (visited on Apr. 5, 2016).

Heather Kelly. Which is the best digital assistant: Siri, Cortana, Alexa or Google Now? Jul. 2015. url: http://money.cnn. com/2015/07/28/technology/digital-assistant-interview/index.html (visited on Apr. 5, 2016).

Marc Kohlbrugge. An email app Don Draper would use. Apr. 2014. url: https://medium.com/@marckohlbrugge/an-emailappdon-draper-would-use-1bccaf2b55b7 (visited on Apr. 5, 2016).

Ingrid Lunden. X.ai Lands $2.1M to Build 'Amy', An AI-Powered Personal Assistant for Meetings. 2014. url: http://social. techcrunch.com/2014/05/21/x-ai-lands-2m-to-build-amyan-ai-powered-personal-assistant-for-meetings/ (visited on Apr. 5, 2016).

Wes McKinney. "pandas: a Foundational Python Library for Data Analysis and Statistics". In: Python for High Performance and Scientific Computing (2011), pp. 1-9. url: http://www.dlr.de/sc/Portaldata/15/Resources/dokumente/pyhpc2011/submissions/pyhpc2011_submission_9.pdf (visited on Apr. 5, 2016).

Wes McKinney. Python for Data Analysis: Data Wrangling with Pandas, NumPy, and IPython. O'Reilly Media, Nov. 2012. isbn: 978-1-4493-1979-3. url: http://www.amazon.ca/exec/obidos/redirect?tag=citeulike09-20&path=ASIN/1449319793 (visited on Apr. 5, 2016).

Joanne Mcneil. "Why Do I Have to Call This App 'Julie'?" In: The New York Times (Dec. 2015). issn: 0362-4331. url: http://www.nytimes.com/2015/12/20/opinion/sunday/why-do-ihave-to-call-this-app-julie.html (visited on Apr. 5, 2016).

Dharmendra S. Modha et al. "Cognitive Computing". In: Commun. ACM 54.8 (Aug. 2011), pp. 62-71. issn: 0001-0782. doi: 10.1145/1978542.1978559. url: http://doi.acm.org/10.1145/1978542. 1978559 (visited on Apr. 1, 2016).

Sean Owen et al. Mahout in Action. Greenwich, CT, USA: Manning Publications Co., 2011. isbn: 978-1-935182-68-9.

Fabian Pedregosa. "Scikit-learn: Machine Learning in Python". In: (2011). url: http://arxiv.org/abs/1201.0490 (visited on Apr. 5, 2016).

Fernando P'erez and Brian E. Granger. "IPython: A System for Interactive Scientific Computing". In: Computing in Science & Engineering 9.3 (May 2007), pp. 21-29. issn: 1521-9615. doi: 10.1109/MCSE.2007.53. url: http://scitation.aip.org/content/aip/journal/cise/9/3/10.1109/MCSE.2007.53 (visited on Apr. 5, 2016).

Abdul Ghaffar Shoro and Tariq Rahim Soomro. "Big Data Analysis: Apache Spark Perspective". In: Global Journal of Computer Science and Technology 15.1 (Feb. 2015). issn: 0975-4172. url: http://www.computerresearch.org/index.php/computer/article/view/1137 (visited on Apr. 5, 2016).

Rajendra Kumar Shukla, Pooja Pandey, and Vinod Kumar. "Big data frameworks: at a glance". In: Int. J. Innovations Adv. Comput. Sci. IJACS 4.1 (2015), pp. 169-175. url: http://academicscience.co.in/admin/resources/project/paper/f201501301422607618. pdf (visited on Apr. 5, 2016).

Mark Summerfield. Python 3. Ed. by Wydawnictwo Helion. 2010.
Tom White. Hadoop: The Definitive Guide. en. "O'Reilly Media, Inc.", May 2012. isbn: 978-1-4493-1152-0.

German Search Report dated Jul. 17, 2017 in German Patent Application No. 102016220777.6.

Khan, Atta R., et al. A Survey of Mobile Cloud Computing Application Models, IEEE Communications Surveys & Tutorials, S. 393-413, 2013. doi: 10.1109/SURV.2013.062613.00160.

Partial English Translation of IN359CH2013, dated Aug. 7, 2015, 10 pages.

Siddiqui, M., Villazon, A., Fahringer, T.: Semantic-based on-demand synthesis of grid activities for automatic workflow generation. In: Proceedings of the Third IEEE International Conference on e-Science and Grid Computing, E-SCIENCE 2007, pp. 43-50. IEEE Computer Society, Washington, DC, USA (2007).

Badica, Costin; Braubach, Lars; Paschke, Adrian. Rule-based distributed and agent systems. Rule-Based Reasoning, Programming, and Applications, 2011, p. 3-28.

Kutter M: SOAP-WSDL-1.27. On the Internet <URL:>http://search.cpan.org/~mkutter/SOAP-WSDL1.27/lib/SOAP/WSDL.pmzw.http://web.archive.org/web/20150130084326/http://search.cpan.org/-mkutter/SOAP-WSDL-1.27/lib/SOAP/WSDLpm.

German Office Action dated Aug. 2, 2017 in German Application No. 102016220778.4.

German Office Action dated Aug. 9, 2017 in German Application No. 102016220782.2.

U.S. Office Action dated Nov. 18, 2019 in U.S. Appl. No. 15/679,353.
U.S. Office Action dated Jan. 28, 2019 in U.S. Appl. No. 15/679,296.
Extended European Search Report dated Aug. 17, 2017 in European Patent Application No. 16206620.3.

Japanese Office Action dated May 12, 2020 in Japanese Patent Application No. 2016-233526.

\* cited by examiner

| REGISTRY | | 12 |
|---|---|---|
| ID | INPUT | OUTPUT |
| 1 | PLAIN TEXT | TABULAR DATA |
| 2 | DATABASE | TABULAR DATA |
| 3 | TABULAR DATA | SUMMARY |
| 4 | TABULAR DATA | SUMMARY |

SOFTWARE SERVICE EXECUTION APPARATUS, SYSTEM, AND METHOD

CROSS-REFERENCE TO RELATED APPLICATIONS

This application claims the benefit of German Application No. 102016220778.4, filed Oct. 21, 2016, in the German Intellectual Property Office, the disclosure of which is incorporated herein by reference.

FIELD

Embodiments lie in the field of data processing architectures and in particular relate to the automatic orchestration of software services, such as web software services.

BACKGROUND

The automatic orchestration and composition of software services, such as web services that are already microservices is uncommon, and state of the art approaches rely upon heavy annotations of the web services.

Existing techniques seeking to automate the orchestration and composition of web service fall into two broad groups:
  Those that do not make any decision: all the possibilities to be executed are executed, and the result is equivalent due to set semantics.
  Those that make decisions based on formal logic, which in most advanced cases have two elements:
  a. Some metadata about the quality of the service that is provided by the service.
  b. An orchestration algorithm that uses such metadata to find a plan adjusting to the quality requested by the user or a set of rules.

The problem is that the orchestration is not autonomous, and the annotations are too heavy. It is difficult to annotate new services, and execution planning is onerous. There are some scenarios in which set semantics cannot be applied, and in some other scenarios set semantics may imply a huge computational cost. Therefore, it is desirable to find a system for orchestrating software services in a more selective manner.

SUMMARY

Embodiments include: a software service execution apparatus, comprising: a registry identifying each of a plurality of software services, each identified software service being configured to execute a respective data processing function specified in the registry; a software execution controller, configured to, for each of a plurality of data processing requests: receive the data processing request, the received data processing request defining one or more requested data processing functions, compose an execution schedule, of one or more software services from among the plurality of software services identified in the registry, to fulfill the received data processing request by, for each of the one or more requested data processing functions, identifying a software service for which the processing function specified in the registry matches the requested data processing function, and including the identified software service in the execution schedule; and control execution of the execution schedule. The apparatus further comprises: a machine learning mechanism configured to maintain, for each of the received data processing requests, a record of the composing of the execution schedule and the execution of the execution schedule; wherein: the composing includes, in an automated composing mode, if more than one software services is identified for which the single processing function specified in the registry matches one of the requested data processing functions, requesting a selection of one software service from among the more than one software services as automated selection candidates by the machine learning mechanism; the machine learning mechanism being configured to respond to the request for selection with a selection of one software service from among the automated selection candidates, basing the selection on an analysis of records of the composing and execution of execution schedules in which any of the automated selection candidates is identified or executed.

Advantageously, embodiments leverage a machine learning mechanism to utilize knowledge about previous compositions of execution schedules and executions of the software services, to decide on the composition of a current execution schedule. By recording information about the composing of execution schedules and the execution thereof, the machine learning mechanism builds up a knowledge base which can be called upon to "break ties" (i.e. choose between them) where plural software services are suitable for performing processing to satisfy a requested data processing function.

Advantageously, such a machine learning mechanism enables intelligent scheduling of software services to satisfy a received data processing request in the absence of manual input. It is noted that manual inputs in satisfying previous data processing requests may be utilized by the machine learning mechanism.

Optionally, each software service among the plurality of software services identified in the registry is configured, in response to a call from the software execution controller, to execute processing to perform the respective data processing function on input data identified in the call, an outcome of said executed processing being either output of a processing result or a timeout; and controlling execution of the execution schedule comprises calling the or each of the software services included in the execution schedule to perform the respective data processing function specified in the registry on input data determined by the received data processing request and/or preceding software services included in the execution schedule.

Advantageously, by such an arrangement of software services and execution controller, software services are executable in a series or chain of processing in which the processing result of a preceding software service in the execution schedule is the input data of a proceeding software service in the execution schedule. Specifically, the processing software service in the execution schedule may be the immediately proceeding software service in the execution schedule.

A call is an instruction to execute. The registry may store, for each of the software services, a definition of how to call the software service to execute. The definition includes the syntactic and semantic information necessary for the software execution controller to generate and issue a call to the software service to perform its respective data processing function.

Furthermore, it may be that the record of the execution of the execution schedule maintained by the machine learning mechanism includes, for each of the software services called by the software execution controller in the controlled execution of the execution schedule for the respective data processing request, an indication of the outcome of the executed processing of the software service, as either a timeout or output of a processing result; and the machine learning mechanism being configured to base the selection of one software service from among the automated selection candidates, at least partially, on the recorded indications of executed processing outcomes for the automated selection candidates.

When called to execute by the software execution controller, the software service is executed, and either successfully generates a processing result, or reaches a timeout without completing the processing required to generate the processing result. Timeout is either a maximum time-to-result defined by the software service (starting from the start of execution), which when reached terminates execution and issues a timeout message to the software execution controller, or a maximum time-to-result set by the software execution controller (starting from the call to execute), which when reached corresponds to an assumption by the software execution controller that no processing result will be output and hence an alternative software service is identified and executed.

The machine learning mechanism monitors execution of the software services and records when a called software service times out and when a called software service successfully outputs a processing result.

As a further option, it may be that the record of the execution of the execution schedule maintained by the machine learning mechanism further includes, for each of the called software services, values of one or more characteristics of the input data identified in the call; the machine learning mechanism being configured to base the selection of one software service from among the automated selection candidates, at least partially, on a quantification of similarity between values of characteristics of the input data for the requested data processing function and the recorded values of the one or more characteristics of the input data identified in calls for which the outcome of the executed processing is output of a processing result.

Advantageously, the machine learning mechanism is able to learn how characteristics of input data influence composing and execution of execution schedules. Such learning is used as a factor upon which to base the selection of a software service to fulfill a requested data processing function.

Basing a selection at least partially on a piece of information means that the piece of information is a factor contributing to the decision of which software service to select. For example, each of said factors may be attributed a weighting in an analysis operation (by the machine learning mechanism) to quantify suitability of each of the automated selection candidates as a determination of selection (i.e. the highest-ranked by said quantification is selected). In implementation terms, the machine learning mechanism may include, in addition to the knowledge base (records), a neural network, with those pieces of information upon which the selection is at least partially based being input nodes, and a selection of a software service from plural automated selection candidates being the output node.

Furthermore, the one or more characteristics of the input data may include a measurement of the amount of input data.

For example, such a measurement may be obtained by reference to a management service, controller function, or data storage function from which the input data is accessible. The measurement may be performed by the software execution controller itself, or performed by a separate entity.

Advantageously, certain of the software services may have execution characteristics that predispose them to successfully generate a processing output, or to timeout, with certain ranges of input data size. The machine learning algorithm can learn these predispositions by observation and leverage such learning in selecting software services for inclusion in the execution schedule.

In a particular implementation of the composing procedure, the composing includes, in a manual composing mode, if more than one software services is identified for which the single processing function specified in the registry matches one of the requested data processing functions, requesting a selection of one software service from among the more than one software services as manual selection candidates by a user of the apparatus, and receiving the requested selection from the user; and the machine learning mechanism is configured to include in the record of the composing of the execution schedule for the respective data processing request the identity of the manual selection candidates and an indication of the received user selection; the machine learning mechanism being configured to base the selection of one software service from among the automated selection candidates, at least partially, on the recorded indication of the received user selection from among manual selection candidates including one or more of the automated selection candidates.

The machine learning mechanism is employed to make a selection from among automated selection candidates (the automated implying the responsibility of the machine learning mechanism). Records are maintained of selections made by a user from among manual selection candidates.

Advantageously, the machine learning mechanism learns from user preferences which software services are favored when there are plural suitable to fulfill a requested data processing function. Such learning is a contributory factor in the analysis of the machine learning mechanism to determine a selected software service from plural automated selection candidates.

It may be that the only recorded indications of user selections that are deemed relevant are those in which there is an exact match in the membership of the automated selection candidates (from which the machine learning mechanism is making a selection) and the membership of the manual selection candidates from which the recorded user selection was made. Alternatively, it may be that recorded indications of user selections are deemed relevant as long as one of the automated selection candidates (from which the machine learning mechanism is making a selection) was among the manual selection candidates. For example, it could be that a quotient is calculated, for each of the automated selection candidates, based on a ratio of selections (from manual selections in which the respective automated selection candidate was among the manual selection candidates) to non-selections.

Optionally, all records are given equal weight. As an alternative, more recent records may be weighted higher than less recent records. As a further alternative, similarity of the input data in the record to the input data in the requested data processing function for which a software service is being selected may be taken into account.

The software execution controller need not be fixed in a particular composing mode for an entire execution schedule. Indeed, automated may be a default mode, with the software execution controller being configured to adaptively revert to manual composing mode for particular elements of the composing.

Optionally, the machine learning mechanism is configured to generate a degree of confidence in the selection of one software service from among the automated selection candidates as an outcome of the analysis of records of the composing and execution of execution schedules in which any of the automated selection candidates is identified or executed; the composing including, if the generated degree of confidence is above a threshold minimum value, adding the selection of one software service to the execution schedule, and if the generated degree of confidence is at or below the threshold minimum value, reverting to the manual composing mode for a selection of one software service to perform the requested data processing function.

For example, the degree of confidence may be the quotient mentioned above, calculated for each of the automated selection candidates based on a ratio of selections (from manual selections in which the respective automated selection candidate was among the manual selection candidates) to non-selections. The degree of confidence may be calculate by a binomial test of statistical significance, the two outcomes being selection in a composing record or non-selection in a composing record.

As a particular implementation of the record of composing maintained by the record of the composing of the execution schedule maintained by the machine learning mechanism includes, for each of the one or more requested data processing functions defined by the received data processing request, values of one or more characteristics of the input data identified in the call; the machine learning mechanism being configured to base the selection of one software service from among the automated selection candidates, at least partially, on a quantification of similarity between values of characteristics of the input data for the requested data processing function and the recorded values of the one or more characteristics of the input data in records of composing in which the manual selection candidates includes one or more of the automated selection candidates.

Optionally, the one or more characteristics of the input data includes a measurement of the amount of input data.

Optionally, a quotient may be built up for each of the automated selection candidates (from which a selection is being made by the machine learning mechanism). Such a quotient may be built up, for example, by incrementing a total for each record in which the respective automated selection candidates was among the manual selection candidates and selected, and decrementing the total for each record in which the respective automated selection candidates was among the manual selection candidates and not selected. The value of the increment or decrement in each case may be in proportion to the similarity between the input data in the case of the record to the input data in the case of the present selection.

Optionally, the one or more requested data processing functions defined by the received data processing request are defined as a series of requested data processing functions, and the composing of the execution schedule is performed for each requested data processing function following the composing and execution of the execution schedule for any preceding requested data processing functions defined by the data processing request.

Advantageously, composing the execution schedule in an adaptive rather than prescriptive manner enables account to be taken of the processing outcomes of preceding software services in the execution schedule and, in particular, the processing results thereof.

In which context, series is taken to mean defining an order of processing, and the output of a preceding data processing function in the series forming the input of the adjacent proceeding data processing function in the series.

Embodiments may further comprise a software execution processor, being configured to respond to a call from the software execution controller identifying a software function from among the plurality of software functions and identifying input data, to load and execute the identified software service with the identified input data as input data in the execution.

Furthermore, the apparatus may include a software library storing the plurality of software services on a memory.

Embodiments of another aspect include: a software service execution method, comprising: storing a registry identifying each of a plurality of software services, each identified software service being configured to execute a respective data processing function specified in the registry; and for each of a plurality of data processing requests: receiving the data processing request, the received data processing request defining one or more requested data processing functions; composing an execution schedule, of one or more software services from among the plurality of software services identified in the registry, to fulfill the received data processing request by, for each of the one or more requested data processing functions, identifying a software service for which the single processing function specified in the registry matches the requested data processing function, and including the identified software service in the execution schedule; and controlling execution of the execution schedule. The method further comprises: maintaining, for each of the received data processing requests, a record of the composing of the execution schedule and the execution of the execution schedule; wherein: the composing includes, in an automated composing mode, if more than one software services is identified for which the single processing function specified in the registry matches one of the requested data processing functions, requesting a selection of one software service from among the more than one software services as automated selection candidates by the machine learning mechanism. The method further comprises: responding to the request for selection with a selection of one software service from among the automated selection candidates, basing the selection on an analysis of records of the composing and execution of execution schedules in which any of the automated selection candidates is identified or executed.

Embodiments of another aspect include a computer program which, when executed by a computing apparatus, causes the computing apparatus to function as a system defined in the claims.

Embodiments of another aspect include a computer program which, when executed by a computing apparatus, causes the computing apparatus to perform a method defined above or elsewhere in this document.

Furthermore, embodiments include a computer program or suite of computer programs, which, when executed by a plurality of interconnected computing devices, cause the plurality of interconnected computing devices to operate as a system embodiment.

In any of the above aspects, the various features may be implemented in hardware, or as software modules running on one or more processors. Features of one aspect may be applied to any of the other aspects.

The embodiments also provide a computer program or a computer program product for carrying out any of the methods described herein, and a computer readable medium having stored thereon a program for carrying out any of the methods described herein.

A computer program embodiment may be stored on a computer-readable storage medium.

BRIEF DESCRIPTION OF THE DRAWINGS

Embodiments will now be described, purely by way of example, with reference to the accompanying drawings, in which:—

DETAILED DESCRIPTION

Figure 1:
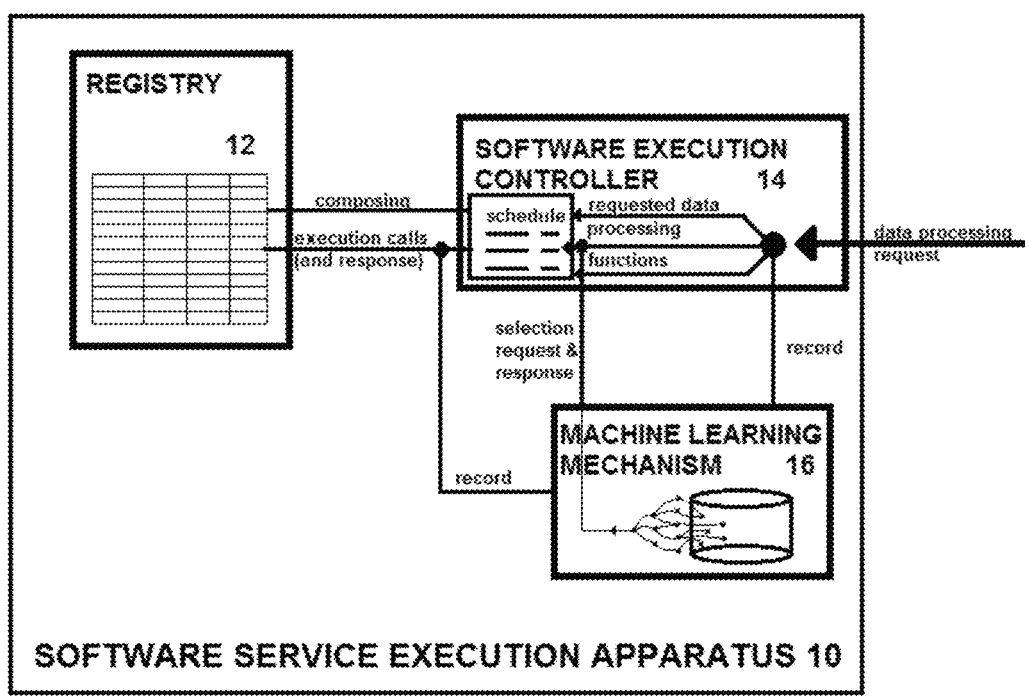
FIG. 1 illustrates a software service execution apparatus.

Reference will now be made in detail to the embodiments, examples of which are illustrated in the accompanying drawings, wherein like reference numerals refer to the like elements throughout. The embodiments are described below by referring to the figures.

FIG. 1 illustrates a software service execution apparatus 10. The apparatus 10 comprises a registry 12, a software execution controller 14, and a machine learning mechanism 14. A selection of data exchanges useful in illustrating the operation of the apparatus 10 are represented in FIG. 1, the illustrated selection of data exchanges is not exhaustive.

The software execution apparatus 10 may be, for example, a web server or other server-side computing apparatus configured to receive data processing requests from a user. Such a user may operate the apparatus 10 directly, or may access the software execution apparatus (i.e. send data processing requests thereto) via a web client or other client-side computing apparatus connectable to the software execution apparatus via a network. In particular, a user may issue a data processing request to the apparatus 10, which is received by the software execution controller 14, as illustrated by the arrow labeled "data processing request" in FIG. 1.

The registry 12 may be a document or other form of data stored in persistent storage by the software service execution apparatus 10. The registry 12 may be a data storage unit having physical data storage arranged to store the data of the registry 12. The registry 12 may store information related to each software service as a registry entry, for example, the identity of the software service being a primary key. The registry 12 may store data as relational data, with one row per software service, or as graph data, with each software service identifiable by a predicate linking the input and processing result of the software service as vertices in the graph.

Each of the plurality of software services identified by the registry 12 may be identified, for example, by a URL (uniform resource locator) or URI (uniform resource identifier) at which the software service is accessible. Accessible in this context is taken to mean a (virtual or physical) location at which calls to the methods of the software service may be issued. The identification of the software service may include, for example, an API defining how the software service is usable.

The data processing function for each software service in the registry 12 may be defined semantically (for example, "tokenize"; "load"; "summarize"; "compare"), the semantic definition being a semantic descriptor of the data processing executed by the respective software service. Such semantic definition may also be (wholly or partially) a URL or URI at which the software service is accessible. In addition, or as an alternative, to the semantic definition, the data processing function may be specified in terms of the input data and output data of the data processing. For example, a data type, which may be indicated by a filename, file type, or by a semantic descriptor of the data type, may be specified for the input data and/or the data processing result (output data).

The apparatus may further comprise a registry of types, wherein the semantic descriptors of the data type are constrained to be one or more types from the registry of types. The registry of types may be domain specific.

The software execution controller 14 is a functional module, which may be a programmed processor (CPU or GPU), programmed by stored (on a memory) processing instructions. In addition, the software execution controller 14 is configured to communicate with the plurality of software services (via the respective registry entry) and, for example, with the machine learning mechanism 16, and/or with an apparatus user. The software execution controller 14 may comprise an I/O interface for communicating with the software services locally or over a network, using information stored in the registry 12. The software execution controller 14 may comprise an interface for receiving input from a user. The interface may be local or may be, for example, a GUI implemented in a client-side apparatus from which inputs are accessible by the software execution controller 14.

FIG. 1 illustrates a data processing request received by the software execution controller 14 being divided into three constituent data processing functions, three being merely an example to illustrate the principle of operation. The received data processing request defines one or more requested data processing functions. It may be that some processing of the data received data processing request is performed by the software execution controller in order to determine the constituent requested data processing function(s). That is to say, the constituent data processing function(s) may be implicitly defined by the received data processing request and extracted (i.e. made explicit) by the software execution controller 14, for example, by reference to the data processing functions specified in the registry 12. An order in which the constituent data processing functions are to be performed in order to fulfill the data processing request may also be defined by the data processing request.

An execution schedule is a plan identifying which software services to execute, in which order (noting that the order may include parallel execution of plural software services), and with which input data. The composing and control of execution are not necessarily steps performed serially. It may be that the composing is adaptive rather than prescribed or predetermined. The composition of an element of the execution schedule may be dependent upon the outcome of execution of preceding software services in the execution schedule.

The line marked "composing" between the registry 12 and software execution controller 14 in FIG. 1 illustrates the use of information in the registry to compose the execution schedule. The execution schedule is composed by the software execution controller 14 in order to fulfill the received data processing request, by using information stored in the registry 12 about the software services. For example, it may be that the received data processing request specifies input data and a particular data type sought in return, for example, specifying the particular data type semantically or by use of a particular filename or group of filenames. The execution schedule is composed by the software execution controller 14 by determining a software service or series of software services listed in the registry 12 which, when executed (in the case of a series, with proceeding software services in the series taking as an input the processing result(s) of one or more preceding software service(s) in the series) transform the input data specified in the data processing request into output data satisfying the particular data type sought in return.

Each of the software services is configured to execute a respective data processing function. The data processing executed by each of the software services transforms input data of a particular type into output data of a particular type. The exception to this singular input type to output type relationship is the event of a failure of the software service, such as a timeout, which does not generate output data of the output type. Type means a type of data, and may be specified by, for example, a single or group of filename extensions or file types, and/or by a semantic descriptor or descriptor(s) of the data.

Controlling execution of the execution schedule by the software execution controller 14 is a process of issuing calls to the respective software services to execute, in the order/timing determined by the execution schedule, and with input data specified by the execution schedule. The line marked "execution calls (and response)" between the software execution controller 14 and the registry 12 in FIG. 1 illustrates the control of execution, and the optional response detailing the outcome and processing result of said execution. For example, controlling execution comprises calling the or each of the software services included in the execution schedule to perform the respective data processing function specified in the registry on input data specified in the call. The input data may be specified by the received data processing request and/or the processing result of preceding software services included in the execution schedule. Input data may be specified by reference to a URI or URL from which it is accessible.

An outcome of the execution may be returned to the software execution controller 14 in response to the execution call, for use in composing the remainder of the execution schedule for the respective data processing request. The outcome may be, for example, an indication of whether a processing result was generated or whether the execution timed out. Optionally, the response may include information such as a measurement of the size of data output by the executed software service as a processing result.

The execution calls and response thereto are illustrated as being between the software execution controller 14 and the registry 12. This is representative of the software services themselves being accessible via information stored in the registry 12.

The composing process may be performed by the software execution controller 14 in a manual mode (requiring input from a human user of the apparatus) or in an automatic/automated mode. In an automated mode, the machine learning mechanism 16 is called on to select between plural software services suitable for performing a particular requested data processing function, as illustrated by the line marked "selection request & response" in FIG. 1. In a manual mode, input of a user is called on to select between plural software services suitable for performing a particular requested data processing function.

A match between a data processing function specified for a software service in the registry 12 and a requested data processing function is an indication that the software service for which the single processing function is specified is suitable to perform the requested data processing function. The match is based on the definition of the requested data processing function, and the data processing function specified for the software service in the registry 12. The match may be based on semantics, for example, the data processing function is defined semantically in the registry 12 (for example, "tokenize"; "load"; "summarize"; "compare") and the requested data processing function is defined semantically using the same or similar term(s), so that a semantic comparison between the semantic definition of the requested data processing function and the semantic definition of the data processing function yielding a similarity score above a threshold is taken to be a "match". Alternatively or additionally, the definition of the requested data processing function may be defined in terms of input data and requested processing result, for example, defining each by a semantic descriptor of the data type ("tabular data" "matrix" "document" "vector") or by a filename extension. The data processing functions specified in the registry 12 may be defined in the same way, so that a match is matching input and output filename extensions, or matching (i.e. semantic similarity above a threshold) input and output semantic data type descriptors. A data type descriptor is a semantic representation of the structure of the data and of the composition of data items.

The record maintained by the machine learning mechanism may be termed a knowledge base.

Whether the software execution controller 14 performs composing an automated mode or a manual mode is controllable by a user, for example, via an interface providing controls to the software execution controller 14, or by specifying particular arguments in the data processing request.

The machine learning mechanism monitors the operation of the software execution controller 14 and maintains a record, as indicated by the lines marked "record" in FIG. 1. In particular, the record maintained by the machine learning mechanism may detail the data processing request, the composing of the execution schedule (in terms of identified manual/automated execution candidates and selections), and the execution (in terms of outcome of the execution and characteristics of the execution and input/output data).

Records of composing identify when more than one software service is identified for which the single processing function specified in the registry matches one of the requested data processing functions (i.e. when there are plural automated/manual execution candidates from which a selection is made), and which among the more than one was/were selected for inclusion in the execution schedule. In addition, an indication of whether the composing was performed in a manual or automated composing mode may be recorded.

Records of execution identify which software services were executed, and in which order. Optionally, records of execution may also store values of execution characteristics, such as time to execute, time of execution (as in, time of day), outcome of execution (timeout or output of data processing result).

Records of execution or records of composing may also store values of characteristics of the input data to the executed software service (in the case of records of execution) or the input data for which a software service is selected (in the case of records of composing). Characteristics may include, for example, data size (in terms of storage space), data type, filename or file type, whether stored locally or remotely, whether available in a local cache, characteristics may also include statistical characteristics of the values of the data items themselves.

Records of execution may also store values of characteristics of the processing result (output data) output by the executed software service. Characteristics may include, for example, data size (in terms of storage space), data type, filename or file type, whether stored locally or remotely, whether available in a local cache, characteristics may also include statistical characteristics of the values of the data items themselves.

The records maintained by the machine learning mechanism 16 provide knowledge to inform future selections between plural selection candidates (i.e. selection candidates being more than one software services identified by the software execution controller for which the single processing function specified in the registry matches one of the requested data processing functions). The identifying of candidates by the software execution controller 14 is based on predefined (i.e. defined by a software developer or apparatus administrator on addition to the registry) information about the software service which is compared (matched) to defined elements of the data processing request. The selection between plural candidates performed by the machine learning mechanism 16 is based on information (i.e. records) about previously-performed composing and execution of execution schedules.

Figure 2:
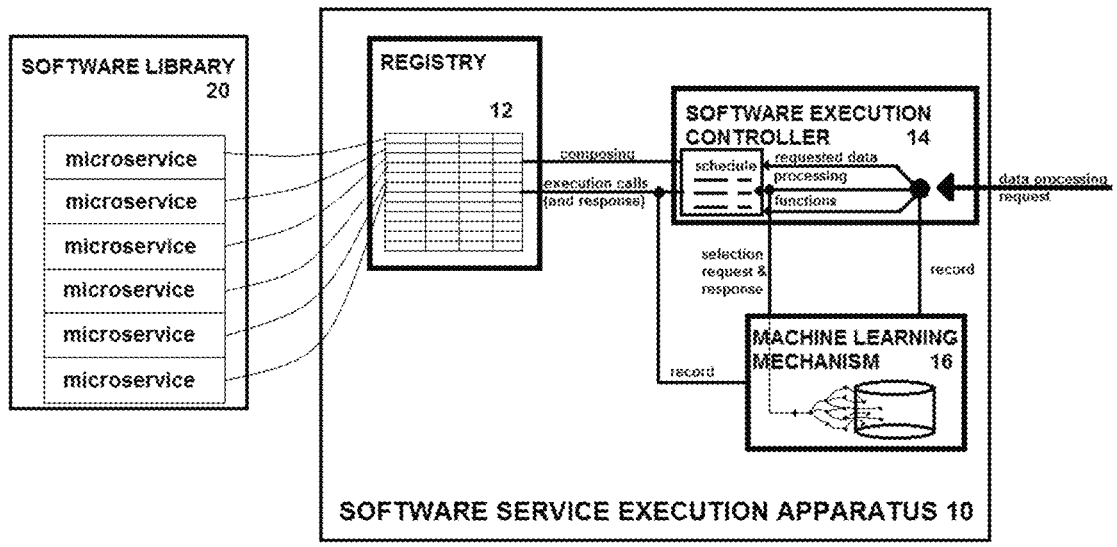
FIG. 2 illustrates a software service execution system.

FIG. 2 illustrates a software service execution system. In addition to the software service execution apparatus 10, the system comprises a software library 20. The software library stores a plurality of executable software services. In the example illustrated in FIG. 2, the software services are micro-services. FIG. 2 illustrates that each of the micro-services in the software library 20 is accessible via information stored in a respective entry in the registry 12.

A micro-service is an atomic service in a data processing apparatus. Atomic in this context means single responsibility or single function. A micro-service is distinguished from a generic web service by the dimension of service. For example, a generic web service would include some form of authentication as part of a wider functionality. In a micro-service-based apparatus, authentication is a dedicated micro-service.

The software services, whether micro-services or otherwise, may be RESTful software services, each defining methods for GET, and POST and/or PUT requests.

REST (Representational State Transfer) is an architectural style which governs the proper behavior of participants in the web for machines. REST sets out constraints for system architectures to which conforming is described as being 'RESTful', the first of which is that the architecture has a client-server arrangement, with clients being separated from servers by a uniform interface. There are four guiding principles of the interface between client and server, and an interface developed in accordance with these principles can be described as 'RESTful'. For example, an API can be written in accordance with the REST guiding principles for interfaces to the software services, and would hence be described as a 'RESTful API'. Such a restful API for a software service may be stored in the registry entry for a software service, or stored in a location made accessible (for example, by a reference) in the registry 12. HTTP as a protocol can be used in a RESTful manner, and RESTful HTTP is suitable for the web for machines. RESTful interfaces (APIs) are popular for a number of key reasons: there is simplicity of the basic protocol built on a proven foundation with solid architectural principles, and the result is approachable and usable by web developers.

In brief, the REST architectural style describes six constraints (one of the six is optional) on a system architecture are as follows:
the architecture should be client-server;
the client and server are separated by a uniform interface;
the architecture is stateless, meaning that no client context is stored on the server between requests from the client—each request contains all of the information necessary to service the request, with state information held in the client itself;
clients are able to cache responses;
(optional) functionality may be extended by a server transferring logic to a client which the client can execute.

In the context of the software service execution system, the client is the entity making the data processing request, and the server is the web server or other computing device executing the software services.

The guiding principles for the uniform interface are briefly summarized below:
individual resources in the domain can be identified in requests from the client (this would be via URIs (Universal Resource Identifiers) in a web-based system). The resources themselves are separate entities from the representations returned to the client;
the representation of a resource held by a client is sufficient to give the client enough information to modify or delete the resource on the server (permissions allowing);
each message between client and server contains enough information for the recipient to process the message;
the representation of a resource provided from the server to the client should include hypertext links to related resources.

A positive aspect of the REST architectural style is that it links well with information models, an information model being a formalized description of items in a domain and relationships between those items. The operations allowed in a RESTful API are constrained (fixed), this avoids the unwanted side effects of poor programming behavior which would ordinarily lead to problems in linking an interface with an information model.

In fact, a RESTful API for a particular domain may be defined purely in terms of the information model for the domain, and by how this model then appears inside different data formats, the data formats being wire level (low level or implementation level) manifestations of the information model. Unfortunately, APIs currently in use show disparities regarding their approach to information modeling, how this appears inside data formats, and how the semantics of HTTP are brought to use in the specific domain of the API(s) in question. This lack of consistency is problematic since potential benefits of a RESTful protocols are lost, for example, the potential for re-usable toolkits (eg. standard code) and generic client agents (equivalent to a browser).

Figure 3:
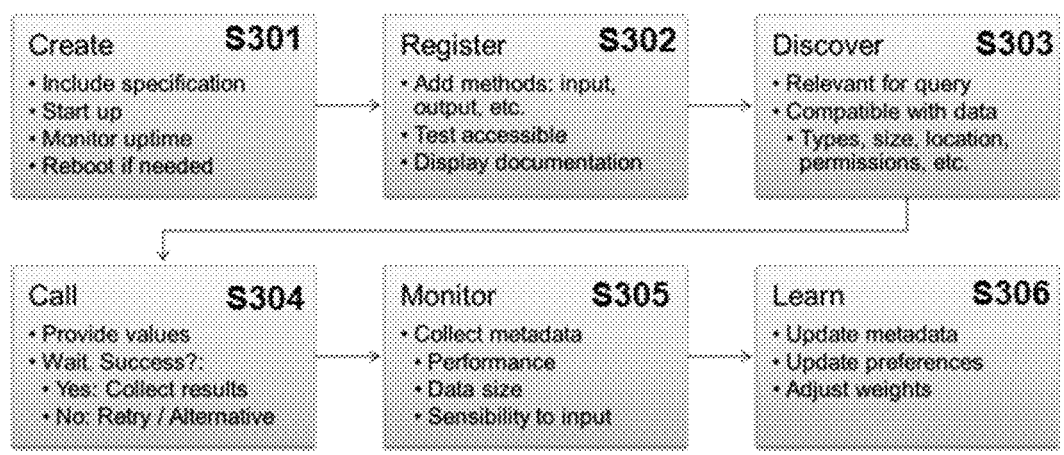
FIG. 3 illustrates a procedure for adding a new software service to the system and composing execution schedules including the new software service.

FIG. 3 illustrates a procedure for adding a new software service to the system and composing execution schedules including the new software service.

Due to the nature of the system, micro-services traverse a number of states.

At step S301, a micro-service is created, with some specification that is implemented. The created micro-service is uploaded to the software library 20, which is kept running by restarting (in a trivial way) if necessary.

At step S302, the micro-service is registered in the registry 12, and metadata of the micro-service is stored in a registry entry. For example, if the respective micro-service is RESTful, information enabling calls to be made to the HTTP GET, PUT, POST, & DELETE methods may be stored in the registry entry. In addition, the registry entry defines input data and output data (processing result) of the data processing function, for example, by semantically describing said data, and/or by specifying file types, data types, and/or filename extensions. Optionally, the registry entry may also detail how to issue a call to the micro-service in a test mode. Optionally, the registry entry may also detail how to issue a call to the micro-service to output documentation related to the micro-service, for example, source code.

At step S303, the micro-service is "discoverable". In other words, once they are registered in the registry 12, micro-services can be discovered by the software execution controller 14 whenever they may be useful for a requested data processing function. The software execution controller 14 queries the registry 12 for software services for which the registry entry indicates it is compatible with the input data for processing in a requested data processing function.

At step S304, the micro-service, having been included in an execution schedule by the software execution controller 14, is called with the inputs (i.e. the micro-service is either told to execute or told to execute and where to access input data), either retrieving the processing result which is output, or timing out, leading the software execution controller 14 to call a different micro-service to perform the requested data processing function.

At step S305, the execution of the micro-service is monitored by the machine learning mechanism 16. Of course, the monitoring may actually be performed by components of the execution platform on which the micro-service is executed, such as operating system components, with the monitoring by the machine learning mechanism 16 being a read access to the relevant information. The machine learning mechanism 16 monitors the execution including, for example, the data processing request in response to which the micro-service is executed (and optionally also the particular requested data processing function being fulfilled), characteristics of the data (for example, size, format, type), the performance of the micro-service (time to solution, timestamp of start of execution), and other relevant aspects of the composing and execution of the execution schedule. The results of the monitoring are recorded in a knowledge base component of the machine learning mechanism 16.

At step S306, in a learning or training phase, algorithms forming the machine learning mechanism 16 (segmentation, regression, prediction, etc.) are fed with the recorded information about execution of micro-services and a model for selecting micro-services is trained to improve outcomes. Outcomes may be, for example, match between selections in manual and automated composing modes. For example, information about input data for a selection between micro-services in a manual composing mode, and result of the selection, is used to train a model for making automated selections between the same micro-services by configuring how much weight is given to similarities/differences between various characteristics of the input data.

Figures 4, 5:
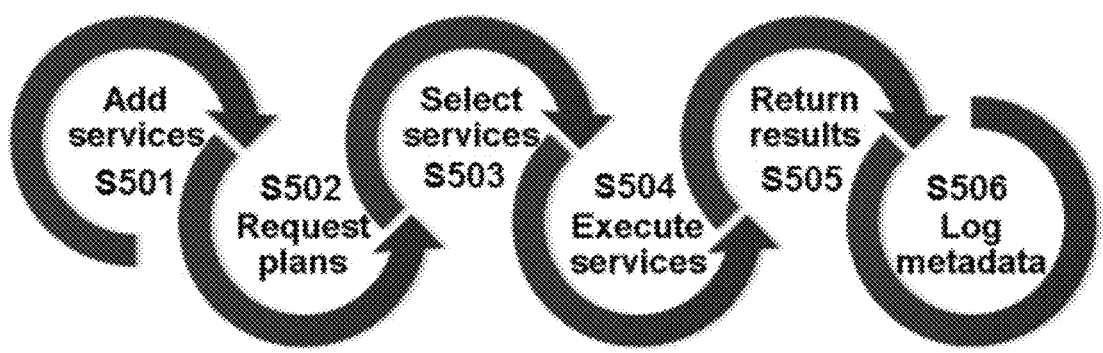
FIG. 4 illustrates exemplary registry entries for a sample set of micro-services.
FIG. 5 illustrates a general procedure of an embodiment.

FIG. 4 illustrates exemplary registry entries for a sample set of micro-services, which microservices will be used in the below worked examples. The information per registry entry illustrated in FIG. 4 is not necessarily a complete registry entry, but illustrates information identifying each software service, and a semantic descriptor of the input data and processing result. The identifying information may be sufficient to locate the software service within the software library 20, for example, if the software library is implemented as a key value store in which the identifying information is the key.

The registry 12 is empty prior to the addition of four micro-services, identified by respective ID numbers 1 to 4.

FIG. 5 illustrates a general procedure of an embodiment. The general procedure is for populating a registry and handling received data processing requests. Specific instances of particular elements of the procedure will be set out with reference to three worked examples, illustrated by FIGS. 6 to 8.

At step S501, services are added to the registry. In terms of the worked examples, two micro-services are added to the registry and assigned ID numbers 1 and 2. Both micro-services are for the generation of tabular data. The micro-service assigned ID number 1 has a processing function of generating tabular data from plain text files (CSV, TSV, etc). Optionally, the "input" element of the registry entry details the acceptable file types, for example, by listing acceptable filename extensions.

The micro-service assigned ID number 2 has a processing function of generating tabular data from databases by doing a natural join of their tables.

Two further micro-services are added to the registry 12, both performing the same function: summarize tabular data. In this case one micro-service, assigned ID number 3, is suitable for big data, while the other implementation, assigned ID number 4, provides a quick overview in milliseconds if the input data fits comfortably in a local memory.

The registry obtains (for example, from a system administrator) the information about the inputs and outputs of the services, both from syntactic and semantic points of view.

The four micro-services are now registered. At step S502, an execution schedule is requested as a response to receiving a data processing request at the software execution controller 14. The information stored in the registry 12 enables the software execution controller 14 to detect the possibilities for coordination between the micro-services, and hence at step S503 to select micro-services to execute to fulfill the data processing request.

In the worked examples, several execution schedules will be requested. Step S501 is part of an initialization procedure which is to be carried out in order to add a new micro-service to the system, and does not form part of the procedure for responding to a particular received data processing request, which is represented by steps S502 to S506.

At step S504, the software execution controller 14 controls the micro-services to execute in accordance with the execution schedule. At step S505, the processing result requested in the data processing request is output. In all cases, at step S506 the system (specifically, the machine learning mechanism 16) records performance statistics about the micro-services executed and about the composing of the execution schedule.

Figure 6:
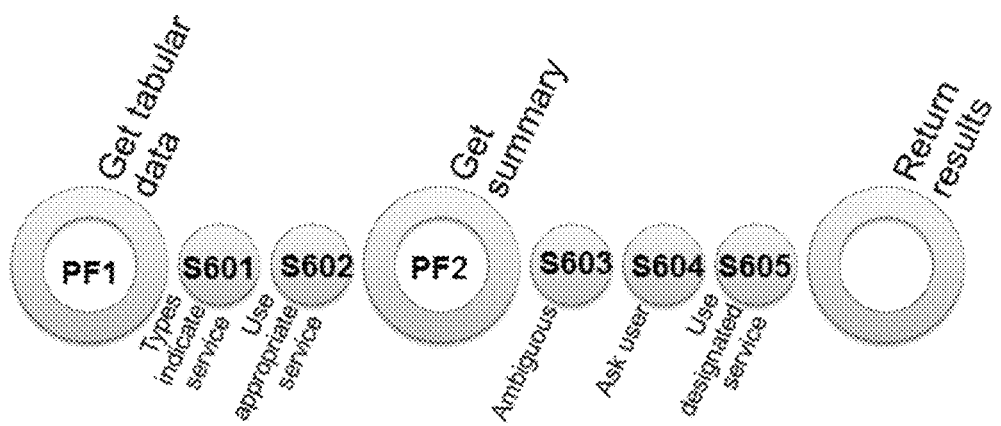
FIG. 6 illustrates a processing flow in a first worked example.

FIG. 6 illustrates a flow of processing in a first worked example. A data processing request is received requesting the summary of a CSV file. The software execution controller, by reference to information in the registry 12, identifies two requested data processing functions defined by the request (because there is no single function generating a summary from CSV input data). The requested data processing functions are PF1, "GET TABULAR DATA", and PF2, "GET SUMMARY". In the present example, the machine learning mechanism 16 has not yet built up a knowledge base upon which to base selections in an automated composing mode, and hence the software execution controller 14 composes the execution schedule in a manual composing mode.

At step S601, composing, based on the information provided in the registry entries and knowledge of the data type of the input data specified in the data processing request, the software execution controller 14 detects that only the micro-service assigned ID "1" can be used to perform request data processing function PF1, and uses said micro-service at step S602, executing, by issuing a call to the micro-service via the registry 12. The processing result is tabular data.

At step S603, the software execution controller 14 performs more composing, in order to perform PF2. The software execution controller 14 detects, based on information in the registry, that plural micro-services are available to summarize tabular data. Since the software execution controller 14 is in a manual composing mode, at step S604, a user is prompted for a selection from among the micro-services assigned ID "3" and "4". For example, the user may be presented with the option to select one of them, a random selection, or all of them.

If the user makes a selection, then knowledge about the user decision is recorded in the knowledge base of the machine learning mechanism 16. For example, such a record may identify the requested data processing function, values of characteristics of the input data (filename, filesize), and an indication of the user selection). In the case of a random selection or all of them, no preference from the user is recorded.

In the present example, the user chooses the micro-service assigned ID "4", the preference is recorded, and at S605, the service is called by the software execution controller 14 and executed. The results are output by the micro-service. There may be an additional step in which the results are presented to the user, however, it may be that the user simply accesses a URL or URI at which the result is output.

Figure 7:
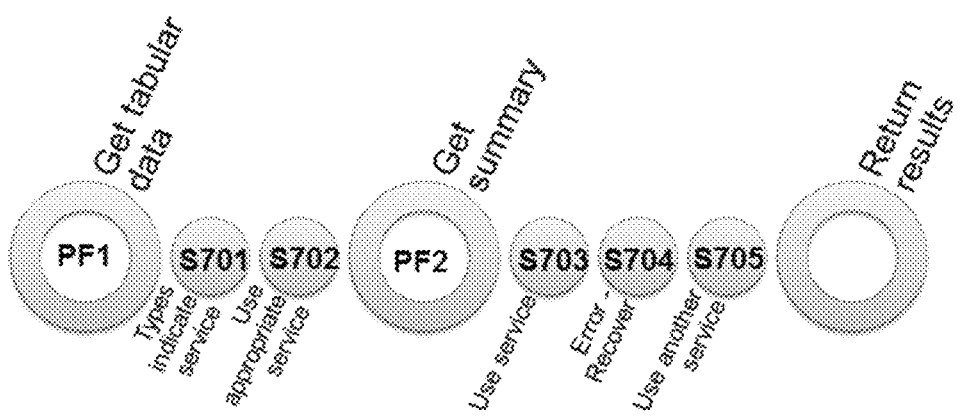
FIG. 7 illustrates a processing flow in a second worked example.

FIG. 7 illustrates a flow of processing in a second worked example. The data processing request is a request for a summary of a large database. The machine learning mechanism 16 has had only a little training, for example, by virtue of the knowledge acquired in the first worked example.

The software execution controller, by reference to information in the registry 12, identifies two requested data processing functions defined by the request (because there is no single function generating a summary from CSV input data). The requested data processing functions are PF1, "GET TABULAR DATA", and PF2, "GET SUMMARY".

At composing step S701, using the information stored in the registry 12 and knowledge of the data type of the input data specified in the data processing request, the software execution controller 14 detects that only the micro-service assigned ID "2" can be used, and at step S702 uses said micro-service to perform PF1 "GET TABULAR DATA".

The software execution controller 14 proceeds to perform the composing for requested processing function PF2, "GET SUMMARY". The software execution controller 14 is running in an automated composing mode, so when two micro-services are identified for summarizing tabular data (based on information in the registry 12), the user is not prompted for a selection. Instead, a request is issued to the machine learning mechanism 16 for a selection.

The software execution controller has only one relevant composing record for selecting between micro-service ID 3 and micro-service ID4, which is a user selection of ID 4. Therefore, the model for selecting a micro-service is trained to favor micro-service ID4 over micro-service ID3 in such a situation. At step S703, micro-service ID4 is selected by the machine learning mechanism 16 and executed under the control of the software execution controller 14. However, micro-service ID4 is a micro-service intended to operate on data stored in local memory, and cannot produce a processing result from the large externally stored tabular data in the present worked example. The outcome of the execution is an "out of memory" error.

At step S704 the software execution controller recovers from the error by adding a new micro-service to the execution schedule, choosing micro-service ID 3, calls micro-service ID 3 to execute at step S705, and returns the processing result.

Figure 8:
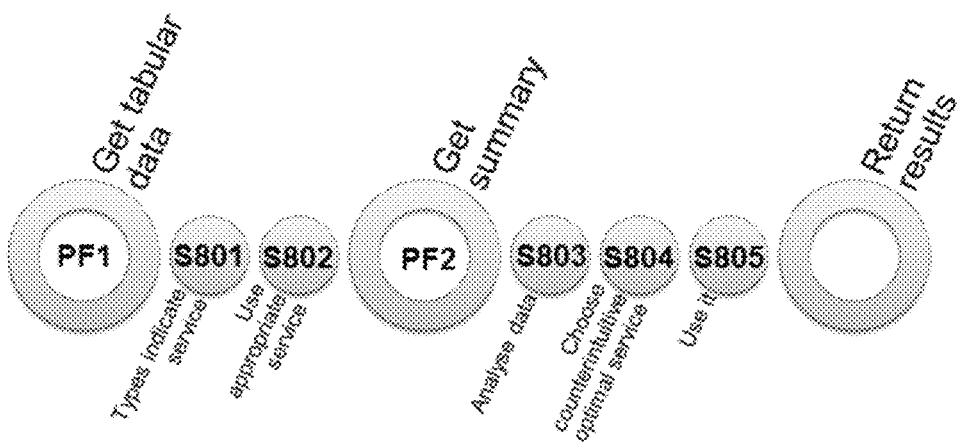
FIG. 8 illustrates a processing flow in a third worked example.

For the third worked example, illustrated by FIG. 8, the data processing request is for the summary of a small database, in a situation in which the machine learning mechanism 16 has been extensively trained.

The software execution controller, by reference to information in the registry 12, identifies two requested data processing functions defined by the request (because there is no single function generating a summary from CSV input data). The requested data processing functions are PF1, "GET TABULAR DATA", and PF2, "GET SUMMARY".

Using the information provide din the data processing request and the registry 12, at step S801 the software execution controller detects that only the micro-service assigned ID "2" can be used to perform PF1, and at step S802 uses said micro-service to perform PF1 "GET TABULAR DATA".

The software execution controller 14 is set to compose in an automated mode, so that no reference to the user is required to select micro-services. For the sake of completeness, it is noted that, in addition to manual and automated composing modes, the software execution controller 14 may be set to a semi-automated composing mode, in which the user is prompted for a selection if the machine learning mechanism cannot achieve a predetermined degree of confidence in a selection.

Based on the type of data in the processing result from step S802, and the information in the registry 12, the micro-services assigned IDs "3" and "4" are deemed suitable to perform PF2. At step S803, values of characteristics of the input data, in particular, a measurement of the amount of data, are acquired. The software execution controller 14 refers to the machine learning mechanism 16 to select between the two suitable micro-services. The model used by the machine learning mechanism 16, which has been extensively trained, is aware that micro-service ID 4 successfully generates output data when a data size of input data is below a threshold, and times out when the data size of input data is above said threshold. Therefore, micro-service ID 4 is selected at step S804, and called to execute at step S805. Again the results are returned, and the usual recording of the performance statistics is performed.

When a new micro-service is added, for example to generate tabular data from tables in HTML, it is added to the capabilities of the system and records about its use are collected by the machine learning mechanism 16. This happens in a way that is transparent to the user of the system, the developers of the micro-services, and the micro-services themselves, that transfer the data without making considerations about the destination, as these considerations are made by the machine learning mechanism 16.

Figure 9:
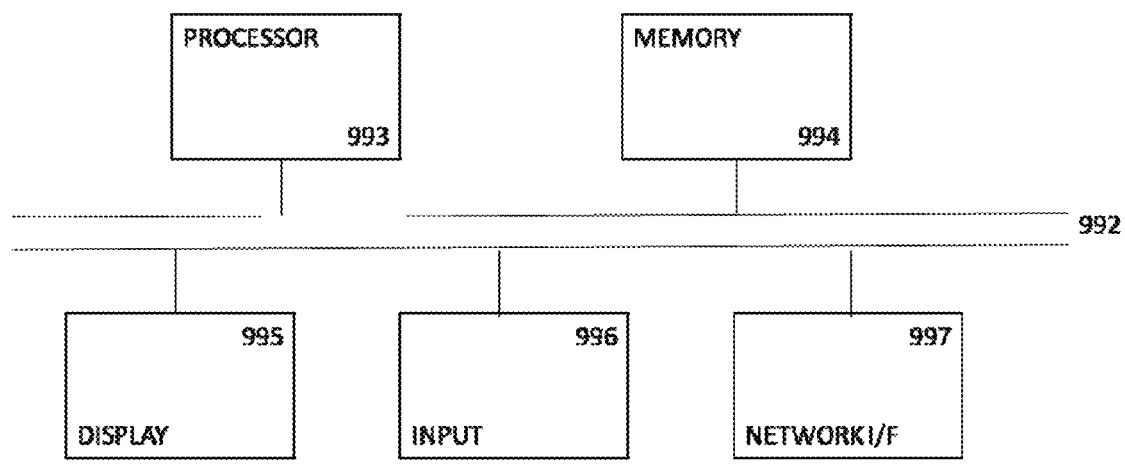
FIG. 9 illustrates a hardware configuration of an embodiment.

FIG. 9 is a block diagram of a computing device, such as a web server, which may be an embodiment, and which may be used to implement a method of an embodiment of the software service execution method. The computing device comprises a processor 993, and memory, 994. Optionally, the computing device also includes a network interface 997 for communication with other computing devices, for example with other computing devices embodiments.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a computer-readable storage medium, which may refer to a single medium or multiple media (e.g., a centralized or distributed database and/or associated caches and servers) configured to store computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. The term "computer-readable storage medium" includes non-transitory computer-readable storage media, Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing code stored in the memory to implement the various different functions of the software service execution apparatus, method, program, and system, described here and in the claims. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit 997 may display a representation of data stored by the computing device and may also display a cursor and dialog boxes and screens enabling interaction between a user and the programs and data stored on the computing device. The input mechanisms 996 may enable a user to input data and instructions to the computing device.

The network interface (network I/F) 997 may be connected to a network, such as the Internet, and is connectable to other such computing devices via the network. The network I/F 997 may control data input/output from/to other apparatus via the network. Other peripheral devices such as microphone, speakers, printer, power supply unit, fan, case, scanner, trackerball etc may be included in the computing device.

The registry 12 of FIGS. 1, 2, & 4, may be a processor 993 (or plurality thereof) executing processing instructions (a program) stored on a memory 994 and exchanging data via a network I/F 997. In particular, the processor 993 executes processing instructions to receive, via the network I/F, software service and in particular information relating to the functionality thereof, from software developers and/or a system administrator and to store a registry entry per software service, as in step S302 of FIG. 3 and step S501 of FIG. 5. Furthermore, the processor 993 may execute processing instructions to transmit, via the network I/F 997 or otherwise, information from registry entries to the software execution controller 14 for composing and execution of execution schedules.

The software execution controller 14 of FIGS. 1 & 2 may be a processor 993 (or plurality thereof) executing processing instructions (a program) stored on a memory 994 and exchanging data via a network I/F 997. In particular, the processor 993 executes processing instructions to receive, via the network I/F, a data processing request from a user (which may be a human user via a client machine, or a higher level software program) and to respond by composing and executing an execution schedule to fulfill the request, as in steps S502 to S505 of FIG. 5. Furthermore, the processor 993 may execute processing instructions to store records of the composing and execution on a connected storage unit (i.e. on a knowledge base of the machine learning mechanism 16) and/or to transmit, via the network I/F 997, results of executing the execution schedule to the requesting client.

The machine learning mechanism 16 of FIGS. 1 & 2 may be a processor 993 (or plurality thereof) executing processing instructions (a program) stored on a memory 994 and exchanging data via a network I/F 997. In particular, the processor 993 executes processing instructions to receive, via the network I/F or otherwise, records of composing and executing of execution schedules for storage in the knowledge base from the software execution controller 14. Furthermore, the processor 993 executes processing instructions to receive, via the network I/F or otherwise, a request for a selection of a software service from among plural software services, to generate a selection from relevant records in the knowledge base, and to respond with a selection, as in step S503 of FIG. 5. Furthermore, the processor 993 may execute processing instructions to store records of the knowledge base on a connected storage unit.

Methods may be carried out on a computing device such as that illustrated in FIG. 9, including the memory 994 which include a non-transitory computer readable storage media for storing the methods. Such a computing device need not have every component illustrated in FIG. 9, and may be composed of a subset of those components. A method may be carried out by a single computing device in communication with one or more data storage servers via a network. The computing device may be a data storage itself storing the processing results from executing the composed execution schedules.

A method may be carried out by a plurality of computing devices operating in cooperation with one another. One or more of the plurality of computing devices may be a data storage server storing at least a portion of the registry 12, the software library 20, the knowledge base of the machine learning mechanism 16, and/or processing results from executing the composed execution schedules.

Although a few embodiments have been shown and described, it would be appreciated by those skilled in the art that changes may be made in these embodiments without departing from the principles and spirit thereof, the scope of which is defined in the claims and their equivalents.

What is claimed is:

1. A software service execution apparatus, comprising:
processor hardware; and
memory hardware coupled to the processor hardware, the memory hardware being configured to store a registry identifying each of a plurality of software services, each identified software service being configured to execute a respective data processing function specified in the registry;
the processor hardware being configured to execute processing instructions stored in the memory hardware to perform:
a software execution control process, comprising, for each of a plurality of data processing requests:
receiving a received data processing request, the received data processing request defining requested data processing functions, and
composing an execution schedule of software services from among the plurality of software services identified in the registry to fulfill the received data processing request by, for each of the requested data processing functions, identifying a software service for which a data processing function specified in the registry matches a requested data processing function, and including the identified software service in the execution schedule;
controlling execution of the execution schedule comprising calling each of the software services included in the execution schedule to perform the respective data processing function specified in the registry based on the respective received data processing request and the processing results of preceding services included in the execution schedule, the preceding services being executed serially; and
a machine learning mechanism process to maintain, for each of received data processing requests, a record of composing of the execution schedule and execution of the execution schedule; wherein:
the composing includes, in an automated composing mode, when a plurality of the software services is identified for which a single data processing function specified in the registry matches one of the requested data processing functions, requesting a selection of one software service from among the plurality of software services identified in the registry as an automated selection candidate among a plurality of automated selection candidates by the machine learning mechanism process; and
the machine learning mechanism process includes responding to a request for selection with the selection of the one software service from among the automated selection candidates, basing the selection on an analysis of records of the composing and execution of execution schedules in which any of the automated selection candidates is identified and executed without any user or manual intervention.

2. A software service execution apparatus according to claim 1, wherein
each software service among the plurality of software services identified in the registry is configured, when executed by the processor hardware in response to a call from the software execution control process, to execute processing to perform a respective data processing function on input data identified in the call, an outcome of executed processing being either output of one of a processing result and a timeout.

3. A software service execution apparatus according to claim 2, wherein
the record of the execution of the execution schedule maintained by the machine learning mechanism process includes, for each of the software services called by the software execution control process in controlled execution of the execution schedule for the respective data processing request, an indication of the outcome of the executed processing of the software service, as one of the timeout and output of the processing result; and
the machine learning mechanism process being configured to base selection of one software service from among the automated selection candidates on recorded indications of executed processing outcomes for the automated selection candidates.

4. A software service execution apparatus according to claim 3, wherein
the record of execution of the execution schedule maintained by the machine learning mechanism process further includes, for each of called software services, values of characteristics of the input data identified in the call; and
the machine learning mechanism process includes basing the selection of the one software service from among the automated selection candidates on a quantification of similarity between values of characteristics of the input data for the requested data processing function and recorded values of the characteristics of the input data identified in calls for which an outcome of executed processing is output of a processing result.

5. A software service execution apparatus according to claim 4, wherein the characteristics of the input data includes a measurement of an amount of input data.

6. A software service execution apparatus according to claim 2, wherein the processor hardware is further configured to execute:
a software execution process, including responding to a call from the software execution control process identifying a software function from among the plurality of software functions and identifying input data, to load and execute the identified software service with identified input data as input data in execution.

7. A software service execution apparatus according to claim 1, wherein
the composing includes, in a manual composing mode, when a plurality of software services are identified for which the data processing function specified in the registry matches one of the requested data processing functions, requesting a selection of one software service from among the plurality of software services as manual selection candidates by a user of the apparatus, and receiving a requested selection from the user;
the machine learning mechanism process includes in the record of the composing of the execution schedule for the respective data processing request an identity of the manual selection candidates and an indication of a received user selection; and
the machine learning mechanism process basing selection of one software service from among the automated selection candidates on a recorded indication of the received user selection from the among manual selection candidates matching one of the automated selection candidates.

8. A software service execution apparatus according to claim 7, wherein the machine learning mechanism process includes generating a degree of confidence in the selection of one software service from among the automated selection candidates as an outcome of analysis of records of the composing and execution of execution schedules in which any of the automated selection candidates is identified and executed; and the composing including, when the generated degree of confidence is above a threshold minimum value, adding the selection of the one software service to the execution schedule, and when the generated degree of confidence is at or below the threshold minimum value, reverting to the manual composing mode for a selection of one software service to perform the requested data processing function.

9. A software service execution apparatus according to claim 7, wherein the record of the composing of the execution schedule maintained by the machine learning mechanism process includes, for each of the requested data processing functions defined by the received data processing request, values of characteristics of the input data identified in the call; and the machine learning mechanism process includes basing selection of one software service from among the automated selection candidates on a quantification of similarity between values of characteristics of the input data for the requested data processing function and recorded values of the characteristics of the input data in records of composing in which at least one of said manual selection candidates is among said automated selection candidates.

10. A software service execution apparatus according to claim 1, wherein the requested data processing functions defined by the received data processing request are defined as a series of requested data processing functions, and the composing of the execution schedule is performed for each requested data processing function following the composing and execution of the execution schedule for any preceding requested data processing functions defined by the data processing request.

11. A software execution system comprising the software execution apparatus of claim 1, wherein the memory hardware is further configured to store: a software library storing the plurality of software services.

12. A software service execution method, comprising:

storing a registry identifying each of a plurality of software services, each identified software service being configured to execute a respective data processing function specified in the registry;

for each of a plurality of data processing requests:

receiving a received data processing request, the received data processing request defining requested data processing functions; and composing an execution schedule of software services from among the plurality of software services identified in the registry to fulfill the received data processing request by, for each of the requested data processing functions, identifying a software service for which a single data processing function specified in the registry matches a requested data processing function, and including the identified software service in the execution schedule;

controlling execution of the execution schedule comprising calling each of the software services included in the execution schedule to perform the respective data processing function specified in the registry based on the respective received data processing request and the processing results of preceding services included in the execution schedule, the preceding services being executed serially; and maintaining, for each of the received data processing requests, a record of the composing of the execution schedule and execution of the execution schedule; wherein the composing includes, in an automated composing mode, when a plurality of the software services is identified for which the single data processing function specified in the registry matches one of the requested data processing functions, requesting a selection of one software service from among the plurality of software services identified in the registry as an automated selection candidate among a plurality of automated selection candidates by the machine learning mechanism; and responding to a request for selection with the selection of the one software service from among the automated selection candidates, basing the selection on an analysis of records of the composing and execution of execution schedules in which any of the automated selection candidates is identified and executed without any user or manual intervention.

13. A non-transitory computer-readable storage medium storing processing instructions which, when executed by a processor hardware, cause the processor hardware to perform:

storing a registry identifying each of a plurality of software services, each identified software service being configured to execute a respective data processing function specified in the registry;

for each of a plurality of data processing requests:

receiving a received data processing request, the received data processing request defining requested data processing functions; and composing an execution schedule of software services from among the plurality of software services identified in the registry to fulfill the received data processing request by, for each of the requested data processing functions, identifying a software service for which a single data processing function specified in the registry matches a requested data processing function, and including the identified software service in the execution schedule;

controlling execution of the execution schedule comprising calling each of the software services included in the execution schedule to perform the respective data processing function specified in the registry based on the respective received data processing request and the processing results of preceding services included in the execution schedule, the preceding services being executed serially; and maintaining, for each of the received data processing requests, a record of the composing of the execution schedule and execution of the execution schedule; wherein the composing includes, in an automated composing mode, when a plurality of the software services is identified for which the single data processing function specified in the registry matches one of the requested data processing functions, requesting a selection of one software service from among the plurality of software services identified in the registry as an automated selection candidate among a plurality of automated selection candidates by the machine learning mechanism; and responding to a request for selection with the selection of the one software service from among the automated selection candidates, basing the selection on an analysis of records of the composing and execution of execution schedules in which any of the automated selection candidates is identified and executed without any user or manual intervention.

\* \* \* \* \*